United States Patent
Christmas

(10) Patent No.: US 6,659,897 B2
(45) Date of Patent: Dec. 9, 2003

(54) CHAIN DRIVE ASSEMBLY

(75) Inventor: Michael Charles Christmas, Cheadle Hulme (GB)

(73) Assignee: Renold PLC (GB)

( * ) Notice: Subject to any disclaimer, the term of this patent is extended or adjusted under 35 U.S.C. 154(b) by 15 days.

(21) Appl. No.: 09/972,134

(22) Filed: Oct. 5, 2001

(65) Prior Publication Data

US 2002/0065160 A1 May 30, 2002

(30) Foreign Application Priority Data

Oct. 9, 2000 (GB) .............................. 0024666
Oct. 17, 2000 (GB) .............................. 0025534

(51) Int. Cl.[7] ............................... F16H 7/06
(52) U.S. Cl. .................... 474/148; 104/172.5
(58) Field of Search .................. 474/59, 148; 198/833; 104/172.1, 172.3, 172.5

(56) References Cited

U.S. PATENT DOCUMENTS

| | | | | |
|---|---|---|---|---|
| 997,071 A | * | 7/1911 | Mangels ....................... | 104/60 |
| 1,706,905 A | * | 3/1929 | Stockly et al. .............. | 198/812 |
| 3,610,160 A | * | 10/1971 | Alimanestianu ............ | 104/165 |
| 6,282,866 B1 | * | 9/2001 | Natterer et al. ............... | 53/282 |

* cited by examiner

Primary Examiner—Thomas R. Hannon
Assistant Examiner—Vicky A. Johnson
(74) Attorney, Agent, or Firm—Akin Gump Strauss Hauer & Feld LLP

(57) ABSTRACT

A chain drive assembly for elevating a load such as a vehicle carriage on a leisure ride. The assembly comprises an endless loop lift chain and a plurality of drive chains. The lift chain has a plurality of chain links comprising a pair of laterally spaced outer link plates pivotally connected to inner link members disposed at least in part between the outer link members. The inner or outer link members of each link have a row of teeth for engagement in openings between links of the drive chains. The drive chains being disposed so as to engage the teeth at a rectilinear stretch of the chain loop so as to drive the chain in a longitudinal direction. The inner and outer links of the lift chain being arranged to define an opening designed to receive a projection on the load. The assembly serves to spread the load between the drive chains and their drive systems. The conveyor chain does not articulate under load and can be reduced in weight. This results in reduced chain wear, elimination of the polygonal effect, the facility to carry increased loads and enables the chain to travel at greatly increased speed.

15 Claims, 4 Drawing Sheets

CHAIN DRIVE ASSEMBLY

CROSS-REFERENCE TO RELATED APPLICATIONS

This application claims priority under 35 U.S.C. §119 to Great Britain Patent Application No. 0024666.0 filed Oct. 9, 2000, and to Great Britain Patent Application No. 0025534.9 filed Oct. 17, 2000.

STATEMENTS REGARDING FEDERALLY SPONSORED RESEARCH OR DEVELOPMENT

Not Applicable.

REFERENCE TO A MICROFICHE APPENDIX

Not Applicable.

BACKGROUND OF THE INVENTION

1. Field of Invention

The present invention relates to a chain drive assembly for elevating a load particularly, but not exclusively, to such a drive assembly for a leisure ride such as, for example, a roller-coaster.

2. Description of Related Art

A schematic representation of an inclined section of a typical leisure ride is shown in FIG. 1. A vehicle carriage for carrying passengers is driven up the incline along a track to a summit by a chain drive assembly. The track then drops steeply from the summit so that as the vehicle carriage follows the track it descends under its own gravity. The chain drive assembly comprises an endless loop bush or roller chain that is disposed under the track and is driven at a lower end of the inclined section by a drive box assembly comprising a drive wheels several guide and tensioning wheels and a suitable motor. The chain is supported on a bearing surface and passes up the incline, around a sprocket wheel at the summit before returning to the drive box assembly. The underside of the carriage has a depending dog which engages in a space between adjacent links of a chain so as to enable the chain to drive the carriage uphill towards the summit. It will be appreciated that, in use, the stretch of chain that extends from the carriage, around the summit sprocket wheel and returns to the drive box, is under tension. It will also be appreciated that in certain rides there may be several vehicle carriages connected together in a train, with only the lead carriage having a dog for engagement with the chain.

There is generally a separate drive system that is responsible for moving the vehicle carriage substantially in a horizontal direction from a starting position where passengers embark to a position where it engages the chain at the commencement of the inclined section.

In contemporary times there is a trend toward rides that are both faster and larger, in the sense that they can carry a greater number of passengers at once, have higher summits and therefore longer descents. As a result, the speed and loads of such leisure rides lave increased dramatically in recent years. For example, in the early 1980s the speed of such rides was typically around 1 to 1.4 m/s and the load capacity around 40 kN whereas now the demand is for rides having speeds in excess of 3 m/s with a load capacity of around 120 kN. These increases put greater demands on the chain and there are several reasons why a conventional cranked link chain is no longer appropriate.

First, the greater the lift height (the height through which the chain must lift the carriage), the load capacity and the speed of the chain, the larger the chain must be. The larger the chain, the heavier it is and therefore, in use, it has to work against its own weight in addition to the load of the carriage and passengers.

Second, leisure ride designers would like the dog of the lead carriage to be larger for safety reasons. In order to accommodate this it is necessary to increase the chain pitch thereby providing a larger gap between adjacent links for the dog to be received. However, a chain with increased pitch requires the drive and driven sprockets to have larger diameters. The corresponding reduction in the number of teeth on the sprockets (as a result of the increased chain pitch) effects an increase in what is known as "the polygonal effect" during the meshing of the chain with the teeth of the sprocket. This effect describes the uncontrolled and rapid movement of the chain links relative to the sprocket teeth during meshing and unmeshing of the chain with the sprocket wheel. The movement arises from the fact that the pitch line of the chain comprises a plurality of straight lines or chords that combine to form part of a polygon rather than a circle (as would be the case for a flexible belt). The rapid and uncontrolled movement of the chain links results in them impacting upon the sprocket with a high velocity thereby generating unwanted noise.

Third, the increased load on the chain results in increased pressure on the bearing surfaces of the chain and consequently the chain is susceptible to increased wear resulting in a reduction in its working life. A significant part of chain wear in a leisure ride drive occurs during its articulation under load around the sprocket (or sprockets) at the summit.

Fourth, the speed of a chain is limited by the centrifugal force of the links as they pass around the sprockets. It will be appreciated that the magnitude of this force on a given chain link increases with its mass.

It is an object of the present invention to obviate or mitigate the aforesaid disadvantages and to provide for a chain drive assembly that is capable of operation with increased loads and at increased speeds in comparison to existing drives.

A known type of escalator chain drive comprises a step chain having a pair of parallel, laterally spaced chain strands that are interconnected by transversely extending elongate axles. Each of the chain strands comprises a plurality of chain links joined end-to-end in an articulating relationship. The links of the chain each have a lower surface on which there is defined a plurality of teeth. The step chain is driven on each side by synchronized roller chains, the teeth of the step chain links being received in spaces between rollers of the drive chains.

BRIEF SUMMARY OF THE INVENTION

According to a first aspect of the present invention there is provided a chain drive assembly for elevating a load, the assembly comprising an endless loop lift chain having a plurality of links, and a plurality of drive members, the chain links comprising a pair of laterally spaced outer link members pivotally connected to at least one outer link member disposed at least in part between the outer link members, at least one of the link members of each link having a plurality of formations for engagement with complementary formations on the drive members, the drive members being disposed so as to engage the formations at a rectilinear portion of the chain loop so as to drive the chain in a longitudinal direction, the inner and outer link members being arranged to define an opening designed to receive a projection on said load.

The chain assembly of the present invention allows a significant part of the load to be carried by the drive members rather than by the chain itself. Since the drive members drive the chain at a rectilinear portion of the chain loop the requirement for the chain to be entrained over drive and driven sprockets is eliminated. Instead, the chain can simply pass over a guide wheel or other guide members at each end of the loop. In view of the fact that the load is carried by the drive members at the rectilinear portion of the lift chain loop, the chain links no longer articulate under significant load and wear is thus reduced considerably. This reduction in wear virtually eliminates the requirement to lubricate the chain. Other advantages include: the chain may be made lighter so the chain speed is not restricted by the centrifugal action of the chain links around the sprocket; there is no need for a polymer bearing surface under the lift chain; and the conveyor chain can be arranged to have an initial stretch that is not inclined.

In one preferred embodiment of the design the outer link members each have said plurality of formations. In an alternative but equally preferred design only the inner link member has said plurality of formations.

The formations are preferably in the form of a row of teeth but may be defined by other profiles.

The link members are ideally in the form of link plates.

An upper surface of the inner link member is preferably shaped so as to receive said projection on said load.

In one preferred embodiment there are provided bearing members outboard of said outer link members, the bearing members being guided along a track so as to prevent lateral movement of chain. The bearing members are preferably rollers disposed on pins of said chain but could alternatively be thrust pads or blocks or the like. The rollers are preferably at least partially enclosed by the guide track which may be of channel-shaped cross-section.

In a preferred embodiment the drive member is in the form of a roller chain having a plurality of links between which are defined clearances into which the formations of the lift chain are received. In alternative embodiment the drive member may be a toothed belt or wheel.

In the instance where the formations are provided on the outer link of the lift chain two drive roller chains are provided, one on each side of the lift chain.

The inner links may comprise a central section of a depth substantially equal to the depth of the outer link and end sections of reduced depth.

According to a second aspect of the present invention there is provided a leisure ride having an inclined track on which a carriage is driven by a chain drive assembly as defined above, the carriage having a projection for engagement in one of said openings of the chain.

BRIEF DESCRIPTION OF THE SEVERAL VIEWS OF THE DRAWINGS

Specific embodiments of the present invention will now be described, by way of example only, with reference to the accompanying drawings in which.

DETAILED DESCRIPTION OF THE INVENTION

Figure 2:
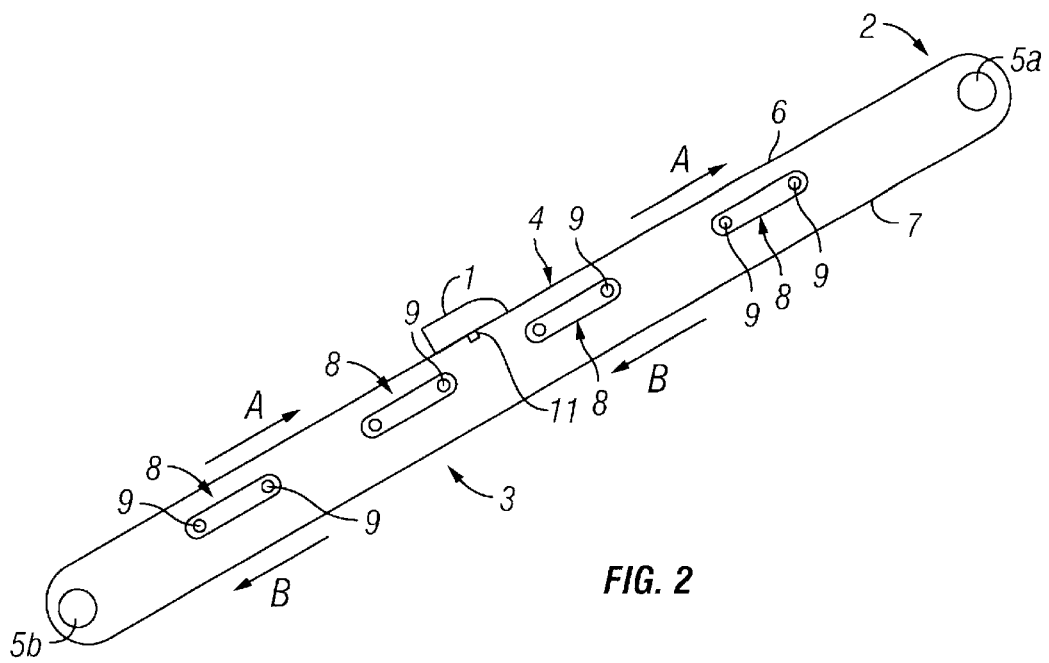
FIG. 2 is a schematic representation of an inclined portion of a leisure ride having a chain drive assembly according to the present invention.

Referring now to FIG. 2 of the drawings, there is shown an upwardly inclined section of a leisure ride in accordance with one aspect of the present invention. In such a ride a vehicle carriage 1 for carrying passengers follows a route defined by a guide track (not shown). In the section of the ride shown in FIG. 2 the carriage 1 is driven up the incline in the direction of the arrows A to a summit 2 by a chain drive assembly 3 disposed beneath the carriage 1. At the summit 2 the track will typically descend with a gradual or steep slope to a lower elevation. The carriage 1 disengages from the chain drive assembly 3 at the summit 2 and follows the track by descending under its own gravity. A typical ride will have several such inclined sections, typically differing in height, with interposed descent sections.

The drive chain assembly 3 depicted in FIG. 2 comprises a lift chain 4 in the form of an inclined endless loop entrained around a guide wheel 5a, 5b at each end so as to define upper and lower rectilinear stretches 6, 7 separated by the guide wheels 5a, 5b. The lift chain 4 is driven in a longitudinal direction up the incline by a plurality of drive chains 8 disposed at regular intervals below the upper rectilinear stretch 6 of the lift chain 4. Each of the drive chains 8 are in the form of an endless loop entrained around drive sprockets 9 that may be driven in rotation by a suitable motor (not shown) or the like. The lift chain 4 has a plurality of openings 10 into which may be received a dog 11 that projects from the underside of a leading vehicle carriage 1. It will be appreciated that the ride may be arranged such that vehicle carriages 1 progress along the track singularly or in a train comprising a plurality of carriages connected in end-to-end relationship. The lift chain 4 is disposed immediately below the guide track and the upper rectilinear stretch 6 of the lift chain 4 engages with the vehicle carriage(s) 1 before it passes over an upper (5a) of the guide wheels disposed at or near the summit 2 and then returns (as the lower rectilinear stretch 7) to a lower guide wheel 5b at the commencement of the incline. The drive chains 8 are driven in synchronous rotation by a suitable control device (not shown in the figures).

Figure 3:
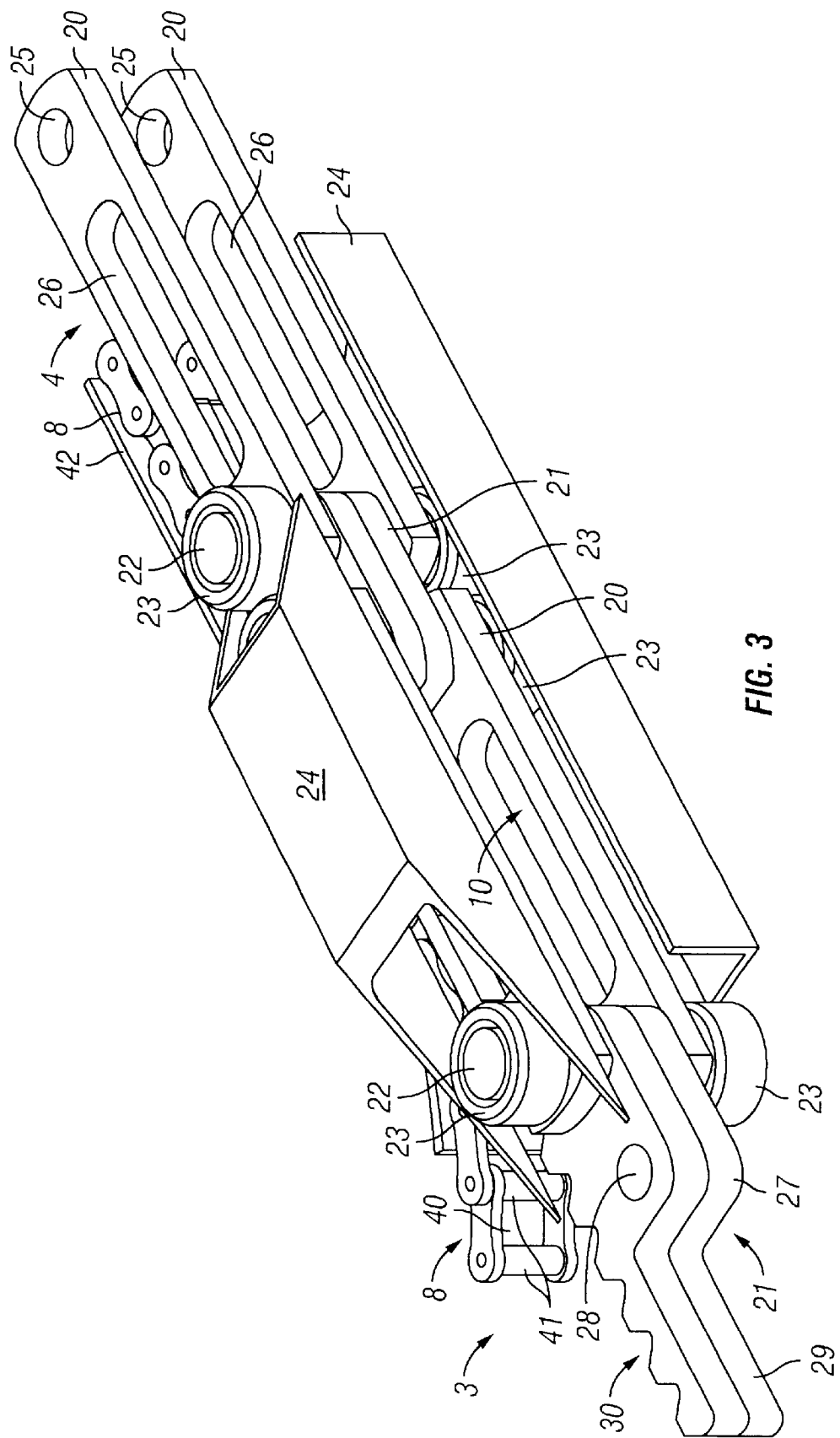
FIG. 3 is a perspective view from above of a first embodiment of a chain drive assembly of the present invention, showing a guide track for the chain.
Figure 4:
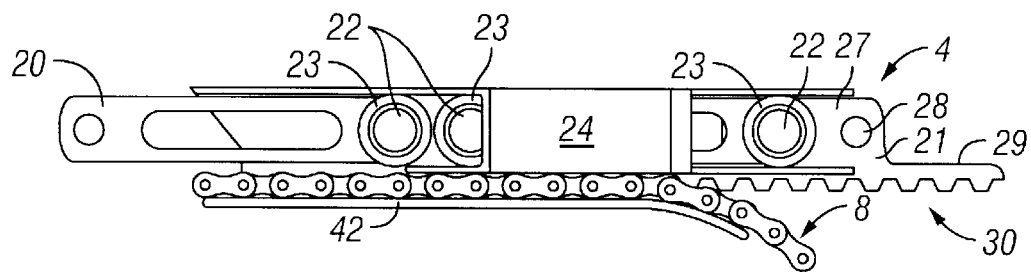
FIG. 4 is a side view of the chain drive assembly of FIG. 3.
Figure 5:
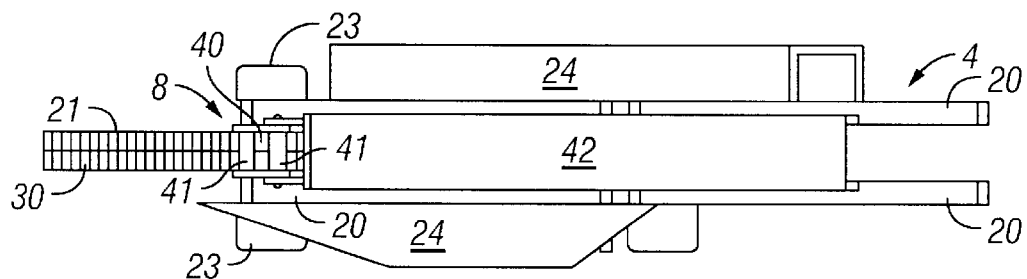
FIG. 5 is an underneath plan view of the chain drive assembly of FIG. 3.
Figure 6:
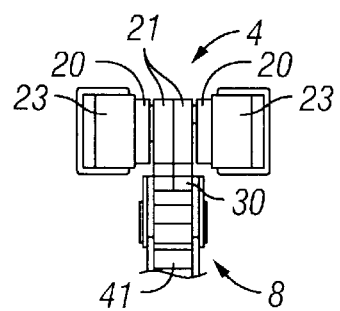
FIG. 6 is a sectioned end view of the chain drive assembly of FIG. 3.

A detailed exemplary embodiment of part of a drive chain assembly according to the present invention is shown in FIGS. 3 to 6. The lift chain 4 comprises opposed pairs of outer link plates 20 that are interconnected by inner link plates 21 via transverse pins 22 such that the outer link plates 20 may articulate relative to the inner link plates 21. The pins 22 project beyond the outer link plates 20 on each side and support roller bearings 23 mounted outboard of the link plates. The chain is flanked on both sides by elongate guide tracks 24 (the one in the foreground in FIGS. 3 and 4 is shown cut-away for clarity) that are channel-shaped in cross section and are arranged so as to receive the roller bearings 23. The outer link plates 20 are elongate and substantially rectangular with arcuate ends. Each plate 20 has an aperture 25 at each end for receipt of the transverse pin 22. In the area between the apertures 25 there is a cut-out section 26 thereby reducing the weight of the chain. The inner link plates 21 each have a central section 27 with two apertures 28 for receipt of the transverse pins 22 and end sections 29 of reduced depth. The undersides of the inner link plates 21 have toothed formations 30 for engagement with the drive chains 8. Between the central sections 27 of adjacent inner link plates 21 the reduced depth end sections 29 of the inner link plates 21 and the flanking opposed outer link plates 20 combine to define the opening 10 for the receipt of a carriage dog 11.

Part of one of the drive chains 8 is shown in FIGS. 3 to 6. It comprises a standard roller bush chain with the space 40 between adjacent rollers 41 being designed to receive a respective tooth on the underside of the inner link plates 21 of the lift chain 4. The drive chain 8 is supported on a bearing surface 42 and is driven by a conventional toothed drive sprocket (not shown).

Figure 1:
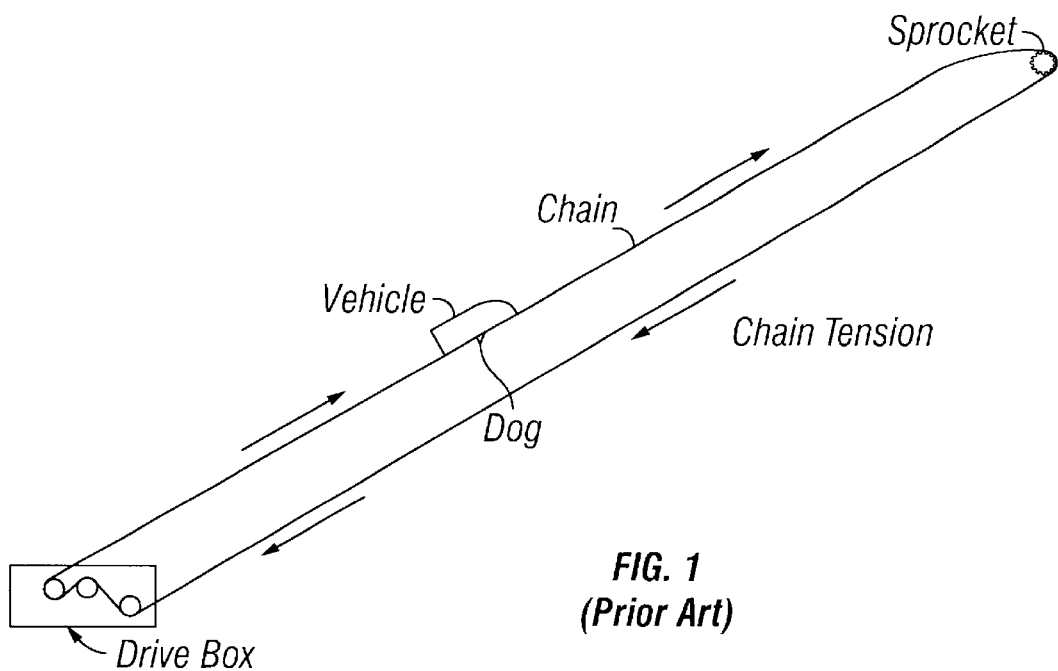
FIG. 1 is a schematic representation of an inclined portion of a conventional leisure ride.

In operation, the drive chains 8 revolve in synchronization and by virtue of their engagement with the toothed formation 30 on the inner link plates 21 of the lift chain 4 the latter is driven longitudinally in the rectilinear direction of the arrows A, B shown in FIG. 1. This arrangement serves to spread the load between the drive chains 8 and their drive systems. Since the load is carried in a rectilinear plane there is very little load on the lift chain 4 when its links 20, 21 articulate around the guide wheels 5a, 5b at each end. This means that chain wear is significantly reduced, the polygonal effect is eliminated and since there are no teeth on the guide wheels there is no need for the lift chain to have rollers or bushes. Moreover, since the lift chain does not carry so much of the load it can be made significantly lighter thereby reducing the centrifugal force of the links as they travel over the guide wheels at each end. As the drive chains are smaller and lighter than a conventional lift chain they can be operated at a faster speed. These factors mean that the chain speed may be increased significantly in comparison to conventional drives. For a drive chain of 30 mm pitch it is anticipated that the lift chain speed could reach 8 m/s or higher. The lack of wear in the chain also reduces the need for lubrication.

The outboard roller bearings 23 and flanking guide tracks 24 prevent undue lateral movement of the lift chain 4 as well as ensuring it travels smoothly.

In addition to lifting the load up an inclined section, a chain drive assembly of this kind can be used to start the vehicle carriage from rest at the beginning of the ride (where passengers embark) thereby eliminating the conventional carriage transfer mechanism. The lift chain can be arranged around guide wheel to provide a horizontal stretch at the beginning of the ride and the horizontal stretch provided with one or more drive chains.

The upper surface of the inner link plates 21 may have any suitable profile for ensuring effective engagement with the carriage dog 11.

It will be appreciated that numerous modifications to the above-described design may be made without departing from the scope of the invention as defined in the appended claims. For example, the drive chains may be replaced with toothed belts or drive gear wheels having formations complementary to those defined on the underside of the inner link plates of the lift chain. As with the drive chains the gear wheels engage the lift chain in a substantially rectilinear stretch and drive the chain in a rectilinear direction. It is also to be appreciated that the formations defined on the underside of the link plates may be of any suitable form.

Figure 7:
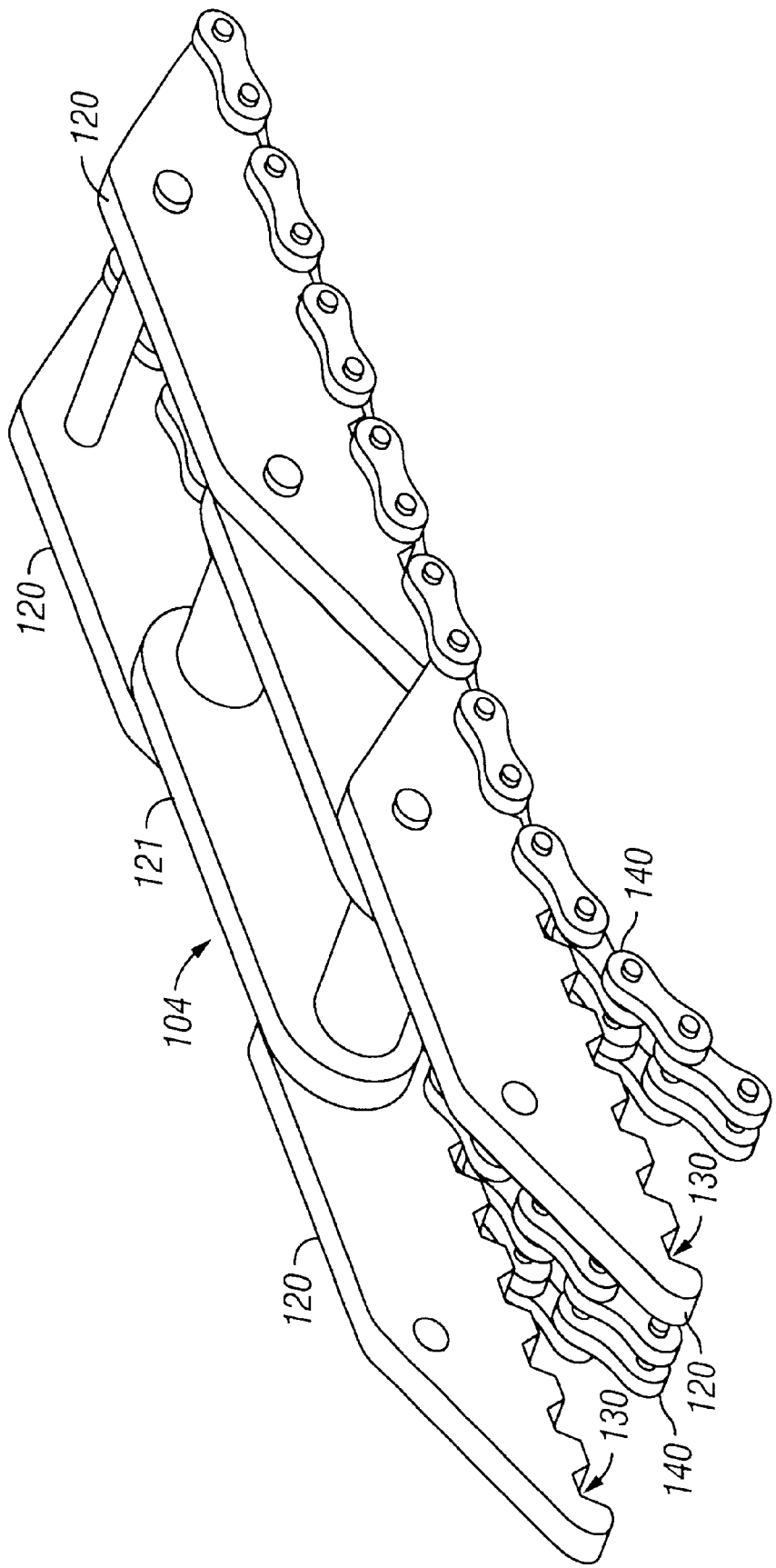
FIG. 7 is a perspective view from above of a second embodiment of the chain drive assembly of the present invention.

An alternative embodiment of the drive chain assembly is shown in FIG. 7. In this design the toothed formations 130 on the lift chain 104 are defined on the underside edge of the outer link plates 120 whilst the inner link plates 121 are of a conventional configuration. This lift chain 104 is driven by a pair of laterally spaced conventional roller chains 140, one disposed under the outer link plates 120 of the lift chain 104. The two drive chains 140 may be joined by at regular intervals by a transverse member (not shown) so as to ensure synchronization and may be driven by a common sprocket having two spaced rings of teeth. Again, the drive chains may be substituted for an alternative drive member such as a gear wheel or a toothed belt. The carriage dog is received in the clearance between adjacent transverse pins of the lift chain. The operation of the drive assembly is identical to that described above.

The foregoing disclosure and description of the preferred embodiment are illustrative and explanatory thereof, and various changes in the components, circuit elements, circuit configurations, and signal connections, as well as in the details of the illustrated circuitry and construction and method of operation may be made without departing from the spirit and scope of the invention.

We claim:

1. A chain drive assembly for elevating a load, the assembly comprising
    an endless loop lift chain having a plurality of lift chain links, and
    a plurality of drive members,
    the lift chain links comprising
        a pair of laterally spaced outer link members pivotally connected to at least one inner link member disposed at least in part between the outer link members, at least one of the inner and outer link members of each lift chain link having a plurality of tooth formations for engagement with the drive members,
    the drive members each comprising
        an endless loop drive chain having a plurality of drive chain links which define clearances into which the tooth formations of the lift chain are received and being disposed so as to engage the tooth formations at a rectilinear portion of the lift chain so as to drive the lift chain in a longitudinal direction,
    the inner and outer link members being arranged to define an opening designed to receive a projection on said load.

2. A chain drive assembly according to claim 1, wherein the inner and outer link members are link plates.

3. A chain drive assembly according to claim 1, wherein an upper surface of the inner link member is shaped so as to receive said projection on said load.

4. A chain drive assembly according to claim 1, further comprising bearing members disposed outboard of said outer link members, the bearing members being guided along a track so as to prevent lateral movement of the lift chain.

5. A chain drive assembly according to claim 4, wherein the rollers are at least partially enclosed by the track.

6. A chain drive assembly according to claim 5, wherein the track is of channel-shaped cross-section.

7. A chain drive assembly according to claim 4, wherein the bearing members are rollers disposed on pins of said lift chain, the pins extending in a direction laterally of the outer link members.

8. A chain drive assembly according to claim 7, wherein the rollers are at least partially enclosed by the track.

9. A chain drive assembly according to claim 8, wherein the track is of channel-shaped cross-section.

10. A chain drive assembly according to claim 1, wherein the drive members are each in the form of a roller chain.

11. A chain drive assembly according to claim 1, wherein the outer link members each have said plurality of tooth formations.

12. A chain drive assembly according to claim 11, wherein there are two drive roller chains provided, one on each side of the lift chain and in driving engagement with the plurality of tooth formations of the respective outer link member.

13. A chain drive assembly according to claim 1, wherein the inner link member has said plurality of tooth formations.

14. A chain drive assembly according to claim 13, wherein the inner link member comprises a central section of a depth substantially equal to the depth of the outer link and end sections of reduced depth.

15. A leisure ride comprising:
   a carriage; and
   a chain drive assembly for elevating said carriage the assembly comprising
      an endless loop lift chain having a plurality of lift chain links, and
      a plurality of drive members,
   the lift chain links comprising a pair of laterally spaced outer link members pivotally connected to at least one inner link member disposed at least in part between the outer link members, at least one of the inner and outer link members of each lift chain link having a plurality of tooth formations for engagement with the drive members,
   the drive members each comprising
      an endless loop drive chain having a plurality of drive chain links which define clearances into which the tooth formations of the lift chain are received and being disposed so as to engage the tooth formations at a rectilinear portion of the lift chain so as to drive the lift chain in a longitudinal direction, the inner and outer link members being arranged to define an opening designed to receive a projection on said carriage.

* * * * *